United States Patent
Wong et al.

(10) Patent No.: US 6,270,847 B1
(45) Date of Patent: Aug. 7, 2001

(54) METHOD OF COOLING COATED PIPE

(75) Inventors: Dennis T. Wong, Toronto; Jiri F. Holub, Etobicoke; Louis Lemenn, Calgary; Richard A. Johnston, Burlington, all of (CA)

(73) Assignee: Dresser-Shaw Company, Calgary (CA)

( * ) Notice: Subject to any disclaimer, the term of this patent is extended or adjusted under 35 U.S.C. 154(b) by 0 days.

(21) Appl. No.: 09/570,059

(22) Filed: May 12, 2000

Related U.S. Application Data

(63) Continuation of application No. PCT/CA97/00903, filed on Nov. 18, 1997.

(51) Int. Cl.$^7$ .............................. B29C 35/16; B05D 7/14
(52) U.S. Cl. .................. 427/398.3; 427/230; 427/233; 427/236; 118/306
(58) Field of Search ........................ 427/230, 231, 427/233, 234, 236, 239, 398.1, 398.3; 118/306, 318, DIG. 10

(56) References Cited

U.S. PATENT DOCUMENTS

| | | | |
|---|---|---|---|
| 2,724,672 | 11/1955 | Rubin | 154/82 |
| 3,411,933 | 11/1968 | Moore | 117/18 |
| 3,904,346 | 9/1975 | Shaw et al. | 427/29 |
| 3,941,087 | * 3/1976 | Yazaki | 118/306 |
| 3,965,551 | 6/1976 | Ostrowski | 29/33 D |
| 4,490,411 | * 12/1984 | Feder | 427/543 |
| 4,510,007 | 4/1985 | Stucke | 156/244.12 |
| 4,800,104 | * 1/1989 | Cruickshank | 427/230 |

FOREIGN PATENT DOCUMENTS

| | | |
|---|---|---|
| 0137663 | 4/1985 | (EP) . |
| 1052431 | 12/1966 | (GB) . |

OTHER PUBLICATIONS

Patent Abstracts of Japan, vol. 007, No. 053 (C–154), Mar. 3, 1983 JP 57–201571A (Sumitomo Kiazoku Kogyo KK).
Patent Abstracts of Japan, vol. 010, No. 182 (C–356) Jun. 25, 1986 JP 61–028477A (Sumitomo Metal Ind. Ltd.).

\* cited by examiner

*Primary Examiner*—Shrive Beck
*Assistant Examiner*—Michael Cleveland
(74) *Attorney, Agent, or Firm*—Ridout & Maybee

(57) ABSTRACT

Pipe coated with a hot plastic coating is cooled by applying a liquid cooling medium to the interior of the pipe. The cooling medium may be applied from a lance or pressurised cart that is stationary relative to the surroundings and moves internally relative to sections of pipe that pass successively through coating and cooling stations.

13 Claims, 2 Drawing Sheets

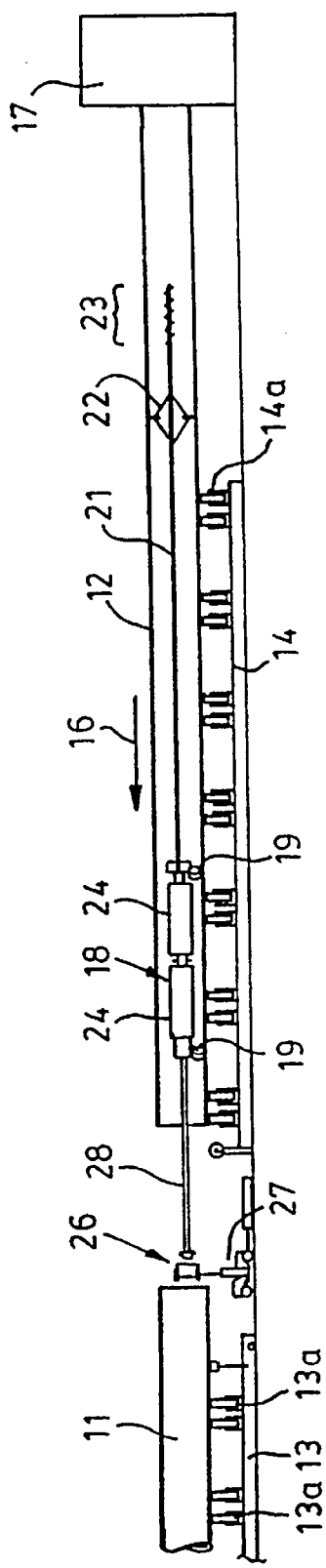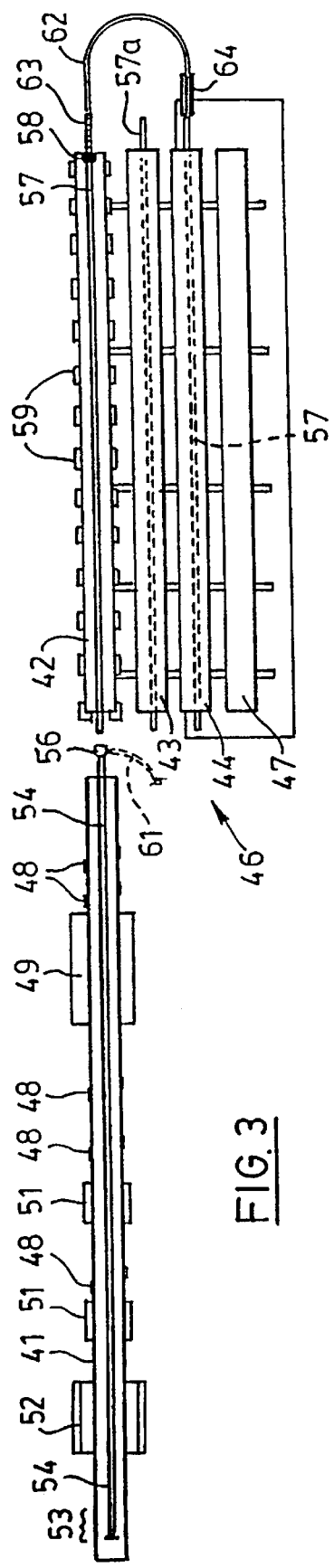

METHOD OF COOLING COATED PIPE

CROSS REFERENCE TO RELATED APPLICATION

This application is a continuation of PCT/CA97/00903 filed Nov. 18, 1997.

TECHNICAL FIELD

This invention related to the art of coating pipes. In particular, the invention relates to the art of cooling a coating after its application.

BACKGROUND

In the manufacture of pipe coatings, the pipe is heated to a high temperature and polymeric material applied as a powder or extruded on. The material is or becomes molten and conforms to the pipe surface. Usually, the pipe is spun or rotated about its axis. After sufficient time has elapsed for flow and/or curing to occur, the material is cooled to solidify it and to prevent damage during further handling. Damage can occur if the still molten coating comes into contact with equipment used to transport it such as supporting tires on a conveying line. In known processes cooling has been carried out by flooding the outside surface with cold water using many open or spray nozzle pipes. The process lasts until the material has reached the predetermined temperature.

With the known cooling procedures, it has always been a problem to obtain a defect free coating, especially with pipes that have raised weld profiles. It has been found that the difficulty arises in part due to shrinkage when the coating solidifies as well as in which order the different regions solidify.

Solidification of the outer surface first produces a skin layer which is highly stressed in tension and not yet bonded to the pipe surface. If the layer has a defect such as a pinhole or bubble, this becomes the weakest point and the coating can tear at this position. Where there is a concave curvature on the surface, such as at a neck area of a weld, the tension in the skin layer causes it to pull away from the pipe surface. The material at the pipe surface is still molten and yields, but at the same time creating pinholes and cavities to replace the displaced material. The cavities in the coating at the neck of the weld, which are referred to as tenting, can run for considerable distances along the weld length.

On a convex surface such as on the top of a weld, the still molten material under the frozen skin can be squeezed away to produce a lower than specified coating thickness when the coating becomes entirely frozen.

SUMMARY OF THE INVENTION

The present invention provides a method of cooling hot plastic coated pipe, comprising applying a liquid cooling medium to the interior surface of the pipe.

The transformation of the coating from a flowable or molten state to solid state using cooling of the pipe interior has numerous advantages compared to exterior cooling. For example, the material at the pipe surface is solidified first. This promotes better adhesion to the surface, and minimizes any frozen-in stresses at the interface which can affect the coating adhesion at a later time.

Interior cooling eliminates damage at defects and, in the case in which the pipe is welded pipe, that is to say metal, usually steel, pipe having a longitudinal externally raised weld profile, eliminates tenting at the weld areas. The solidification front moves from the pipe-coating interface towards the outer surface of the coating exposed to the air (the coating-air interface) which is the last area to become solidified. The coating material, which shrinks during solidification, can flow and shrink inwards at the air exposed surface. This process is not hindered and results in low coating stress.

The molten outer surface of the coating does not come into contact with the cooling medium which can deform and affect it to produce an irregular surface. With interior cooling, the outer surface solidifies without any physical interference, leaving a uniform and aesthetically satisfactory surface.

A uniform coating thickness can be achieved even on pronounced weld profiles. This means that less coating material need be used to maintain a minimum coating thickness.

Interior cooling is also considerably more efficient than exterior cooling. The overall heat transfer rate to the pipe surface is much higher. Further, the water or other cooling medium remains in the pipe and continues to remove heat whereas with exterior cooling, the water is gone after its initial contact. The invention therefore allows for less water usage as well as a shorter cooling time to get the pipe to the required temperature.

In the preferred procedure for carrying out the present process, a water dispensing device is positioned on the inside of the pipe at the location where the coating is to be cooled. Cooling is applied after the coating has had sufficient time to melt, flow and become smooth.

The water or other medium may be applied using multiple spray tip nozzles, each of which produces a 360° spray pattern. In this manner, the entire circumference of the pipe is cooled along a longitudinal zone covered by the multiple nozzles. This water dispensing device can be held stationary relative to a fixed outside position while the pipe moves forward relative to the nozzles. This results in the cooling of the entire pipe as it travels along. Alternatively the water dispensing device can be made to move in a controlled manner relative to the surroundings, so as to cool the entire pipe.

Many different ways of connecting and controlling the water dispensing device are possible. For example procedures using a fixed lance, or a self propelled cart may be employed.

A fixed lance may be connected from the outside of the pipe by means of a strong flexible hose which also supplies the water. Wheels support the lance on the inside of the pipe. At the end of the lance is a set of nozzles. The lance is held stationary while the pipe is rotating and moving forward. This results in a coating solidification front which is stationary relative to the position where the coating is applied.

A self propelled cart may be supported on the pipe by wheels and is unattached to the outside of the pipe. The cart may contain a pressured reservoir of water that is replenished after cooling each pipe. The alignment of the wheels may be controlled in such a manner as to maintain the relative position of the cart. While the pipe rotates and moves forward, the cart may remain stationary relative to a fixed outside point. The pipe is cooled as it moves forward.

BRIEF DESCIPTION OF THE DRAWINGS

Some cooling procedures are described in more detail, by way of example only, with reference to the accompanying drawings in which:

FIG. 1 shows somewhat schematically a side view of a coating and cooling process.

FIG. 3 shows somewhat schematically a plan view of a further form of coating and cooling process.

DETAILED DESCRIPTION OF THE PREFERRED EMBODIMENT

Figure 2:
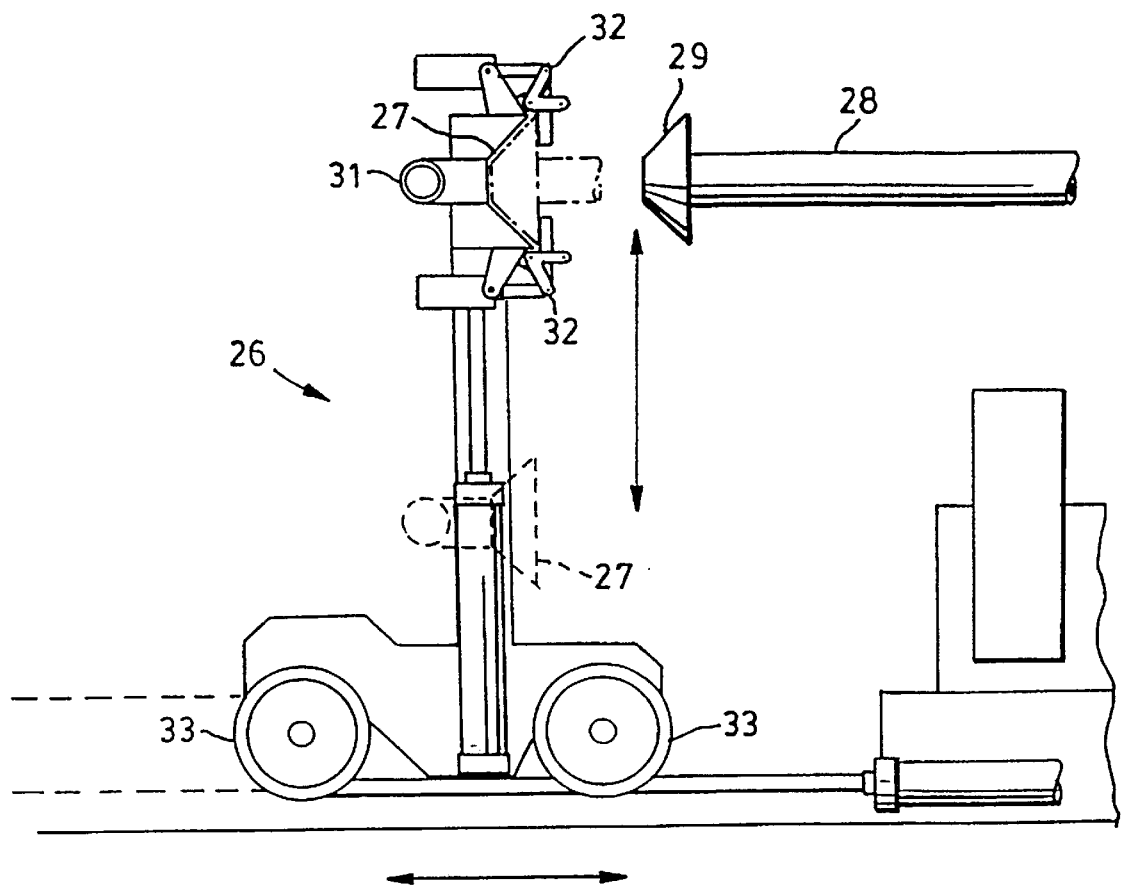
FIG. 2 shows somewhat schematically on an enlarged scale a coupling and cooling medium feed unit used in the apparatus of FIG. 1.

FIG. 1 shows a coated and cooled pipe length 11 and a subsequent pipe length 12 undergoing coating and cooling. The pipes are supported on respective spiral conveyors 13 and 14 comprising driven rubber tires or like rollers inclined to the pipe axis so that the pipe is spun about its axis while being conveyed forwarded in the direction of the arrow 16. Pipe 12 is preheated before entering a coating application station 17, for example a powder application booth wherein polymer powder is applied on the pipe and melts and fuses to the pipe surface. A cart 18 is supported within the pipe 12 on roller members such as wheels 19 journalled for free rotation on axes adjusted to an angle inclined relative to the pipe axis such that as the pipe rotates and travels forwardly, the cart 18 maintains a stationary position relative to the surroundings such as the powder booth 17 and the conveyor 14. Extending rearwardly from the cart 18 is a rigid spray lance 21 supported at an intermediate position through connection to a frame 22 connected to wheels running freely on the interior of the pipe surface. In a zone 23, the end of the spray lance 21 is provided with spray nozzles.

The cart 18 carries one or more pressurizable reservoirs 24, provided, for example, with diaphragms, bladders or the like confining a compressed gas. Normally, the spray lance 21 and nozzles in the zone 23 are fed continuously with pressurized cooling medium, such as cold water supplied by the reservoirs 24.

Normally, successive pipe lengths, such as lengths 11 and 12 travel through the station 17 with their ends in close proximity. FIG. 1 shows a stage at which a leading pipe length 11 has been accelerated to open a gap between its trailing end and the leading end of the following pipe 12, allowing a recharging coupling device 26 seen in FIG. 2 to be actuated to raise its coupling portion 27 from a lower position shown in broken lines in FIG. 2 to an upper position shown in solid lines wherein it is aligned with a forwardly projecting recharging lance 28 connected to the cart 18. The device 26 is then driven rearwardly so that its coupling device 27 receives a complementarily shaped fitting 29 on the forward end of the recharging lance 28, allowing water or other cooling medium to be passed under pressure from a supply line 31 through the lance 28 to recharge the reservoirs 24. During this operation, the fitting 29 may be retained by clamping devices 32. The reservoirs 24 are fully charged by the time the leading end of the pipe 12 approaches the device 26. At this point, the clamping devices 32 are unlocked, the device 26 displaced forwardly on its wheels 33 and the coupling portion 27 dropped downwardly to the dotted line position as seen in FIG. 2, so that the pipe length 12 can be passed forwardly to be received by the tires or like conveyor members 13a of the conveyor 13 which in the meantime has been vacated by the pipe length 11. The pipe length next following the length 12 continues through the spray booth 17 and is cooled by application of the spray from the nozzles in the region 23. After the wheels of the cart 18 have run into the interior of this next following pipe length, when it reaches approximately the position shown for the pipe 12 in FIG. 1, the pipe 12 is accelerated forwardly to the position shown for the pipe length 11 in FIG. 1, and the above described cycle of operation is repeated.

It may be noted that, in the procedure illustrated, the cooled zone 23 is located between the coating application station 17 and the point at which the cooled and coated pipe contacts the rear most of the tires 14a or other conveying devices constituting the spiral conveyor 14.

FIG. 3 illustrates a further form of process wherein a pipe 41 is undergoing coating and cooling while pipes 42, 43 and 44 are detained on a lateral conveyor and rack 46, while a further pipe 47 disposed at an entry station awaits loading onto the rack 46.

Pipe 41 is conveyed on the tires or other roller members of spiral conveyors 48 through an acid and rinse booth 49 and through coils 51 that preheat the pipe for reception of powder in a powder booth 52 to form a flowable plastic coating.

Cooling is applied to the inside of pipe 41 at a region 53 from spray nozzles provided on an end of a rigid spray lance 54 running on angle tracking wheels within the pipe 41 so that the lance 54 maintains station with the surroundings and, in effect, moves rearwardly relative to the pipe 41 as it advances. The lance 54 is supplied with water or other cooling medium through a detachable coupling 56 at its rear end that connects to an auxiliary lance 57 that runs through the next succeeding pipe 42. A rear end of the auxiliary lance 57 is connected to a main water supply through a detachable coupling 58. The next length of pipe 43 contains a length of the auxiliary lance material 57a preinstalled through it.

In operation, the pipe length 42 is accelerated forwardly by spiral conveyors 59 disposed beneath it and forming part of the rack 46 so that its leading edge catches up with the trailing edge of the pipe length 41 and the wheels supporting the rigid lance 54 enter the pipe length 42. Once the pipe 42 has cleared the rack 46 and has reached approximately the position shown for the pipe 41 in FIG. 3, a temporary water supply 61 indicated in broken lines in FIG. 3 is attached to the coupling 56 to supply water to the lance 54, the auxiliary lance 57 is detached from the couplings 56 and 58 and is relocated within the pipe length 44 as shown by a broken line and reference numeral 57. The pipe length 43 containing the auxiliary lance 57a is then moved forwardly to the position shown for pipe 42 in FIG. 3 and the lance 57a is coupled to the supply 58 and to coupling 56, to re-establish supply of water to the lance 54 from the main water supply at 58, and the temporary supply 61 is disconnected. A fresh length of pipe, such as length 47 is then rolled onto the rack, the pipe length 54 now containing the auxiliary lance 57 is rolled forwardly to the position shown for the pipe length 43 in FIG. 3, a fresh pipe length is delivered to the entry station to take the place of pipe length 47 and the above cycle of operation is repeated.

In the preferred form, the auxiliary lance 57 is a flexible pipe so that it can be fed in a part circular path 62 by a caterpillar drive 63 through a guide 64 to enter the pipe length 44.

What is claimed is:

1. A method of forming a hot plastic coating on pipe lengths and subsequently cooling said coating, comprising the steps of:

providing pipe lengths each having an axis, and a coating application station that forms a hot plastic coating on said pipe lengths when conveyed successively therethrough;

providing a conveying device for conveying said pipe lengths continuously, longitudinally, and successively through said coating station in a longitudinal direction parallel to the axis of each pipe length in such manner that a gap exists between adjacent pipe lengths at a region spaced longitudinally from said coating station;

providing a cooling medium supply device running within a pipe length adjacent said coating station, said cooling medium supply device running within the pipe length on roller members inclined relative to the axis of the pipe length so that the cooling medium supply device maintains a stationary position relative to features outside the pipe length, said cooling medium supply device comprising a cart carrying a pressurized reservoir and a recharging lance extending from said reservoir in said longitudinal direction;

providing a recharging apparatus permitting passage of said pressurized cooling medium therethrough and reciprocating parallel to said longitudinal direction and having a coupling portion movable between a retracted position spaced laterally outwardly from said pipe lengths and an extended position wherein said coupling portion aligns with said recharging lance;

conveying said pipe lengths on said conveying device continuously and successively through said coating station to apply a hot plastic coating on said pipe lengths;

cooling said coating by applying said cooling medium continuously to an interior surface of each successive pipe length while downstream from said coating station, said cooling medium being supplied from said pressurized reservoir of said cooling medium supply device; and intermittently recharging said pressurized reservoir by moving said coupling portion, when adjacent said gap between adjacent pipe lengths, to said extended position, moving said recharging apparatus together with said coupling portion in a first longitudinal direction to engage said coupling portion with said lance, flowing said pressurized cooling medium through said recharging apparatus to recharge said reservoir, moving said recharging apparatus in a direction opposite said first longitudinal direction to disengage said coupling portion from said lance, and moving said coupling portion to said retracted position.

2. A method according to claim 1 wherein, in said step of effecting cooling, when the cooling medium is applied, the coating is substantially wholly in a flowable state.

3. A method according to claim 2 wherein, when the cooling medium is applied, the coating is substantially at the temperature at which it was formed.

4. A method according to claim 2 wherein application of cooling medium to a pipe length is commenced while coating is being applied to a rearward portion of the same pipe length.

5. A method according to claim 4 wherein in said step of providing a conveying device, said conveying device comprises conveying members that contact a pipe length at a point spaced downstream from said coating application station, and said cooling medium is applied to the interior of said pipe length at a region between coating application station and said point at which the said coated pipe length contacts said conveying members.

6. A method according to claim 1 wherein the cooling medium is water.

7. A method according to claim 1 wherein in said step of cooling, said cooling medium is applied uniformly to the inside surface continuously along a zone extending longitudinally of said pipe length.

8. A method according to claim 1 wherein in said step of providing a coating application station, said station applies powder-applied coating or an extruded coating.

9. A method according to claim 1 wherein in said step of providing pipe lengths, said pipe lengths are metal pipe.

10. A method according to claim 9 wherein the metal pipe is steel pipe.

11. A method according to claim wherein said metal pipe has a longitudinal externally raised weld profile.

12. A method according to claim 11 wherein the weld profile has a convex curvature on its top exterior to the metal pipe and a concave curvature at the neck of the weld.

13. A method according to claim 1 wherein said recharging apparatus is provided downstream from said coating application station.

* * * * *